United States Patent
Rahulkrishna et al.

(10) Patent No.: US 9,983,984 B2
(45) Date of Patent: May 29, 2018

(54) AUTOMATED MODULARIZATION OF GRAPHICAL USER INTERFACE TEST CASES

(71) Applicant: International Business Machines Corporation, Armonk, NY (US)

(72) Inventors: Yandrapally Rahulkrishna, Bangalore (IN); Saurabh Sinha, Bangalore (IN); Giriprasad Sridhara, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 14/589,279

(22) Filed: Jan. 5, 2015

(65) Prior Publication Data

US 2016/0196021 A1    Jul. 7, 2016

(51) Int. Cl.
*G01R 31/00* (2006.01)
*G06F 11/36* (2006.01)

(52) U.S. Cl.
CPC ................ *G06F 11/3688* (2013.01)

(58) Field of Classification Search
CPC .................. G06F 3/0483; G06F 3/04842
USPC ....... 324/756.02, 500, 537, 756.01; 717/116, 717/120, 136
See application file for complete search history.

(56) References Cited

U.S. PATENT DOCUMENTS

| | | | | |
|---|---|---|---|---|
| 7,856,626 B2* | 12/2010 | Abernethy, Jr. | .......... | G06F 8/72 717/116 |
| 8,020,146 B2* | 9/2011 | Hudson, Jr. | ................ | G06F 8/44 717/120 |
| 8,370,811 B2 | 2/2013 | Grechanik et al. | | |
| 8,473,914 B2 | 6/2013 | Bergman et al. | | |
| 8,490,056 B2 | 7/2013 | Lau et al. | | |
| 8,689,191 B2* | 4/2014 | Dolby | ........................... | 717/136 |
| 2005/0097512 A1* | 5/2005 | VanGilder | ................ | G06F 8/34 717/113 |
| 2010/0162260 A1* | 6/2010 | Ibrahim | .................. | G06F 9/505 718/105 |
| 2011/0219361 A1* | 9/2011 | Dolby | ........................... | 717/136 |
| 2012/0096434 A1* | 4/2012 | Rama | ........................ | G06F 8/36 717/120 |
| 2013/0152044 A1* | 6/2013 | Salecker | ................... | G06F 8/70 717/120 |

(Continued)

OTHER PUBLICATIONS

Mahmud et al., Lowering the barriers to website testing with CoTester. Proc. of IUI, 2010, pp. 169-178.

(Continued)

*Primary Examiner* — Giovanni Astacio-Oquendo
(74) *Attorney, Agent, or Firm* — Ryan, Mason & Lewis, LLP

(57) ABSTRACT

Methods, systems, and computer program products for automated modularization of GUI test cases are provided herein. A method includes grouping test steps derived from one or more application test cases into multiple candidate sub-routines based on a manner in which one or more user interface elements are accessed in each of the test steps; refining the multiple candidate sub-routines to generate a given set of one or more sub-routines; and refactoring the one or more application test cases by replacing the test steps in the one or more application test cases with one or more calls to the given set of one or more sub-routines.

20 Claims, 9 Drawing Sheets

(56) References Cited

U.S. PATENT DOCUMENTS

2013/0247016 A1* 9/2013 Sharma .............. H04N 21/8133
717/136

OTHER PUBLICATIONS

Little et al., Koala: capture, share, automate, personalize business processes on the web. Proc. of CHI, 2007, pp. 943-946.

Leshed et al., Coscripter: Automating and sharing how-to knowledge in the enterprise. Proc. of CHI, 2009, pp. 1719-1728.

"Selenium," http://seleniumhq.org/, Aug. 2012.

Leotta et al., "Capture-replay vs. programmable web testing: An empirical assessment during test case evolution," in WCRE, 2013, pp. 272-281.

Thummalapenta et al., "Efficient and change-resilient test automation: An industrial case study," in ICSE Software Engineering in Practice Track, 2013, pp. 1002-1011.

Yandrapally et al., "Robust test automation using contextual clues," in ISSTA, 2014, pp. 304-314.

A. M. Memon, "Automatically repairing event sequence-based GUI test suites for regression testing," ACM Transaction Software Engineering and Methodology, vol. 18, pp. 1-36, Nov. 2008.

Grechanik et al., "Maintaining and evolving GUI-directed test scripts," in ICSE, 2009, pp. 408-418.

Choudhary et al., "WATER: Web application test repair," in ETSE, 2011, pp. 24-29.

Mang et al., "Automatically repairing broken workflows for evolving GUI applications," in ISSTA, 2013, pp. 45-55.

Leotta et al., "Improving test suites maintainability with the page object pattern: An industrial case study," in ICST Workshops, 2013, pp. 108-113.

"Page Objects," https://code.google.com/p/selenium/wiki/PageObjects, Oct. 23, 2014.

A. M. Memon, "An event-flow model of GUI-based applications for testing," Softw. Test., Verif. Reliab., vol. 17, No. 3, pp. 137-157, 2007.

Marchetto et al., "State-based testing of Ajax web applications," in ICST, 2008, pp. 121-130.

Mesbah et al., "Invariant-based automatic testing of modern web applications," IEEE Trans. Software Eng., vol. 38, No. 1, pp. 35-53, Jan./Feb. 2012.

Amalfitano et al., "Rich internet application testing using execution trace data," in ICST Workshops, 2010, pp. 274-283.

Thummalapenta et al., "Guided test generation for web applications," in ICSE, 2013, pp. 162-171.

Mesbah et al., "Crawling Ajax-based web applications through dynamic analysis of user interface state changes," ACM Trans. on the Web, vol. 6, No. 1, pp. 1-30, Mar. 2012.

Nguyen et al., "GUITAR: An innovative tool for automated testing of GUI-driven software," Automated Software Engg., vol. 21, No. 1, pp. 65-105, Mar. 2014.

Gross et al., "EXSYST: Search-based GUI testing," in ICSE, 2012, pp. 1423-1426.

Fard et al., "Feedback-directed exploration of web applications to derive test models," in ISSRE, 2013, pp. 278-287.

Mesbah et al., "Automated cross-browser compatibility testing," in ICSE, 2011, pp. 561-570.

Ganov et al., "Event listener analysis and symbolic execution for testing GUI applications," in ICFEM, 2009, pp. 69-87.

Thummalapenta et al., "Efficiently scripting change-resilient tests," in FSE Tool Demonstrations Track, 2012.

Mariani et al., "AutoBlackTest: Automatic black-box testing of interactive applications," in ICST, 2012, pp. 81-90.

Huang et al., "Repairing gui test suites using a genetic algorithm," in ICST, 2010, pp. 245-254.

Roest et al., "Regression testing Ajax applications: Coping with dynamism," in ICST, 2010, pp. 127-136.

Devaki et al., "Efficient and flexible GUI test execution via test merging," in ISSTA, 2013, pp. 34-44.

Tsantalis et al., "Identification of extract method refactoring opportunities," in CSMR, 2009, pp. 119-128.

Komondoor et al., "Effective, automatic procedure extraction," in IWPC, 2003.

* cited by examiner

103

| | Action | Target | Data |
|---|---|---|---|
| 1. | click | Registration | |
| 2. | enter | Login | L1 |
| 3. | enter | Password | P1 |
| 4. | enter | Confirm Password | P1 |
| 5. | enter | First Name | John |
| 6. | enter | Last Name | Smith |
| 7. | click | Register | |
| 8. | click | Sign in | |
| 9. | enter | Login | L1 |
| 10. | enter | Password | P1 |
| 11. | click | Login | |
| 12. | exists | (successful login) | |

105

| | Action | Target | Data |
|---|---|---|---|
| 1. | click | Registration | |
| 2. | enter | Login | L2 |
| 3. | enter | Password | P2 |
| 4. | enter | First Name | John |
| 5. | enter | Last Name | Smith |
| 6. | click | Register | |
| 7. | exists | (error message) | |

FIG. 1B

```
      Sub EnterRegDetails (Str[ ] data, Bool [ ] control)
1.       enter, Login, data [1]
2.       enter, Password, data [2]
3.       if (control [1])
4.          enter, Confirm Password, data [3]              ─ 202
5.       enter, First Name, data [4]
6.       enter, Last Name, data [5]
7.       click, Register
8.       if (control [2])
9.          exists, error message
      End sub
      Test t1
1.       Str [ ] data = { "L1", "P1", "P1", "John", "Smith" }
2.       Bool [ ] control = {true, false}
3.       click, Registration                                ─ 204
4.       call EnterRegDetails (data, control)
5.       click, Sign in
6.       enter, Login, L1
7.       enter, Password, P1
8.       click, Login
9.       exists, successful login
      End test
      Test t2
1.       Str [ ] data = { "L2", "P2", " ", "John", "Smith" }
2.       Bool [ ] control = {false, true}                   ─ 206
3.       click, Registration
4.       call EnterRegDetails (data, control)
      End test
```

FIG. 2

Input: Test suite $T$
Output: Set $S_C$ of candidate subroutines

↙ 402

1  foreach $t \in T$ do
2  $\quad$ initialize $S_c = (D, \psi, E, p), l_{prev}$
3  $\quad$ foreach $s = (a, e, d) \in t$ do
4  $\quad\quad$ let $D_{curr}$ be the DOM snapshot before step $s$
5  $\quad\quad$ let $l_{curr}$ be the LCA of $e$ and $l_{prev}$ in $D_{curr}$
6  $\quad\quad$ if startNewSubroutine $(l_{prev}, l_{curr}, D_{curr}, E)$ then
7  $\quad\quad\quad$ let $l$ be the LCA in $D_{curr}$ of the elements in $E$
8  $\quad\quad\quad$ set $D$ to the subtree in $D_{curr}$ rooted at $l$
9  $\quad\quad\quad$ set $p$ to the path from the root node to $l$ in $D_{curr}$
10 $\quad\quad\quad$ add $S_c$ to $S_C$
11 $\quad\quad\quad$ reinitialize $S_c, l_{prev}$
12 $\quad\quad$ else
13 $\quad\quad\quad$ set $l_{prev}$ to $l_{curr}$
14 $\quad\quad$ add $e$ to $E$, add $s$ to $\psi$ 15 return $S_C$

FIG. 4

Input: Set $S_G = \{S_{G_1}, \ldots, S_{G_m}\}$ of subroutine groups
Output: Set $S_f = \{S_{f_1}, \ldots, S_{f_n}\}$ of final subroutines

⟵ 502

// Refine $S_G$ based on element overlap to create $S_{G_1}$
1  initialize $S_{G_1}$ to the empty set
2  foreach $S_{G_i} \in S_G$ do
3      while $S_{G_i} \neq \emptyset$ do
4         sort $S_{G_i}$ in decreasing size of element set $E$, initialize $S_{G_o}$
5         remove the first subroutine from $S_{G_i}$ and add it to $S_{G_o}$
6         foreach $S_c \in S_{G_i}$ do
7            let $E$ be the element set of $S_c$
8            let $E_a$ be elements of $E$ that occur in a DOM in $S_{G_o}$
9            if $(|E_a|/|E|) > \lambda_e$ then
10              remove $S_c$ from $S_{G_i}$ and add it to $S_{G_o}$
11        add $S_{G_o}$ to $S_{G_1}$ // Compute final subroutines from $S_{G_1}$, further refining the subroutine groups in case of conflicts in step sequences
12 initialize $S_f$ to the empty set
13 foreach $S_{G_i} \in S_{G_1}$ do
14     sort $S_{G_i}$ in decreasing length of step sequence
15     while $S_{G_i} \neq \emptyset$ do
16        remove the first sub, $S_{c_1}$ from $S_{G_i}$ and initialize $S_f$ with it
17        let $\psi_1$ be the step sequence of $S_{c_1}$
18        initialize graph $G$ with canonical representation of $\psi_1$
19        foreach $S_c \in S_{G_i}$ do
20           let $\psi_c$ be the canonical rep. of the step sequence of $S_c$
21           if adding $\psi_c$ to $G$ does not create a cycle in $G$ then
22              remove $S_c$ from $S_{G_i}$
23              update test mapping information $\gamma$ for $G$
24        let $\psi$ be the step sequence in topological sort order of $G$
25        add $(\psi, \gamma)$ to $S_f$ 26 return $S_f$

FIG. 5

AUTOMATED MODULARIZATION OF GRAPHICAL USER INTERFACE TEST CASES

FIELD OF THE INVENTION

The present application generally relates to information technology, and, more particularly, to modularization of graphical user interface (GUI) test cases.

BACKGROUND

Test cases that drive an application under test via the GUI of the application are commonly used in functional and/or regression testing of enterprise applications. Such a test case includes a sequence of steps that perform actions on, or verify the state of, the application user interface. An enterprise application can include, for example, hundreds of such functional and/or regression test cases that exercise various application functionalities via the GUI of the application. Such GUI tests are commonly created using a test-automation tool and coded in the programming language supported by the tool.

Like any software system, GUI test cases require maintenance after creation. Additionally, as an application under test evolves, the test cases may need to be adapted accordingly. For instance, certain tests can become obsolete and, therefore, removed from the test suite, whereas other tests may need to be repaired (via addition, deletion, and/or modification of test steps) to reflect updated application functionality. By way of example, certain screens in the application might change, requiring the tests that navigate to that screen to be updated accordingly.

SUMMARY

In one aspect of the present invention, techniques for automated modularization of GUI test cases are provided. An exemplary computer-implemented method can include steps of grouping test steps derived from one or more application test cases into multiple candidate sub-routines based on a manner in which one or more user interface elements are accessed in each of the test steps; refining the multiple candidate sub-routines to generate a given set of one or more sub-routines; and refactoring the one or more application test cases by replacing the test steps in the one or more application test cases with one or more calls to the given set of one or more sub-routines.

In another aspect of the invention, a modularization device can include a candidate sub-routine computation module, executing on the modularization device, to cluster test steps derived from multiple application test cases into multiple candidate sub-routines based on information pertaining to user interface element access associated with each of the test steps. The device also includes a sub-routine refinement module, executing on the modularization device, to refine the multiple candidate sub-routines to generate a final set of one or more sub-routines. Further, the device includes a test case refactoring module, executing on the modularization device, to refactor each of the multiple application test cases by replacing each of the test steps in each of the multiple application test cases with a call to a sub-routine in the final set of one or more sub-routines.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1B is a diagram illustrating two test cases that navigate the example registration page for the bookstore web application depicted in FIG. 1A;

FIG. 2 is a diagram illustrating an extracted sub-routine, as well as refactored versions of the test cases depicted in FIG. 1B, according to an example embodiment of the invention;

FIG. 4 is a diagram illustrating an example algorithm for identifying candidate sub-routines, according to an example embodiment of the invention;

FIG. 5 is a diagram illustrating an example algorithm for computing final sub-routines, according to an example embodiment of the invention;

DETAILED DESCRIPTION

Figure 1A:
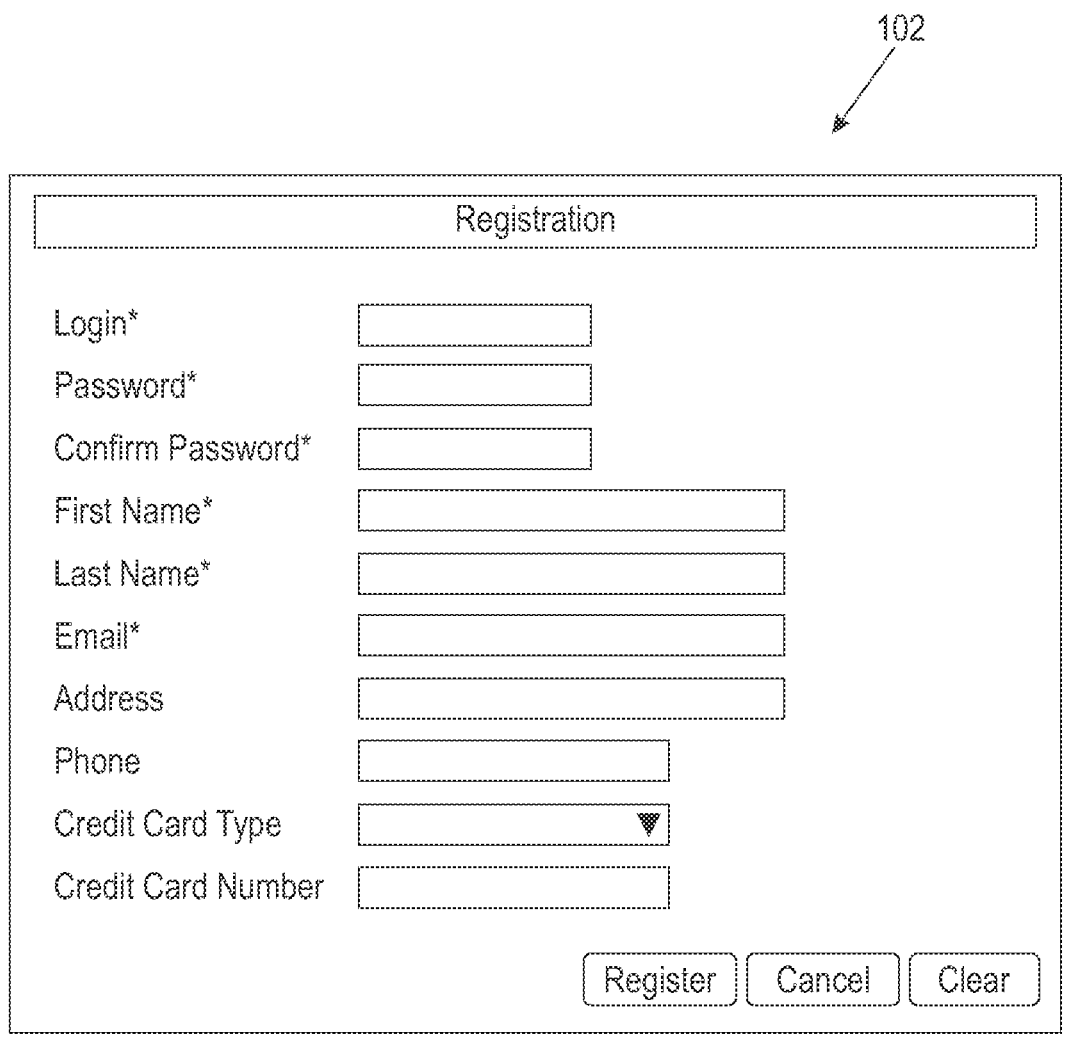
FIG. 1A is a diagram illustrating an example registration page for a bookstore web application.

As described herein, an aspect of the present invention includes techniques for automated modularization of GUI test cases. At least one embodiment of the invention includes an automated test-modularization technique that does not rely on the availability of training samples and that takes into account the UI elements and the structure of the pages accessed in one or more tests.

Modularization of GUI tests requires the structure of the navigated pages to be analyzed, so that elements on a "page" or, at a more granular level, in a "form" can be aggregated into a module. Accordingly, one or more embodiments of the invention includes recovering the structure of the navigated pages by analyzing the UI elements accessed in the test steps. As used herein (and understood by one skilled in the art), a "page" is associated with one or more uniform resource locators (URLs), and a "form" can be related to one or more hypertext markup language (HTML) elements.

As noted herein, in certain AJAX-style applications which contain significant client-side processing, there is often no clear distinction between pages (for example, all application pages can have the same URL). Similarly, in such applications, forms need not be associated with HTML form elements. Accordingly, at least one embodiment of the invention includes analyzing an underlying DOM of the pages navigated by test cases.

Also, as used herein, a test case refers to a sequence of test steps $<s_1, \ldots, s_n>$ that represents a testing scenario, wherein each $s_1$ is an action performed on the application user interface (that is, an action step) or a verification of the user-interface state (that is, a verification step). A test step is a triple (a, e, d) that includes a command a, a target UI element e, and an optional data value d. The command a can be a predefined verification command (for example, exists, selected, enabled) that is a predicate on the state of a UI element, a predefined action command (for example, right-click), or a generic action command (for example, enter, select).

A sub-routine refers to a part of (or the entirety of) a test case. Also, a sub-routine has a common ancestor node which is the least common ancestor (LCA) of all of the target elements referenced in its test steps. As detailed herein, a DOM, such as DOM 302 depicted in FIG. 3 and described further herein, includes an internal representation of a web browser for a given webpage, wherein the representation can include a tree-like structure with various HTML elements as its nodes. Accordingly, a node can include any HTML element in a webpage.

An XPath, as used herein, refers to a path from the root of the DOM to any given node in the DOM. Also, a common ancestor of two (or more) nodes in a DOM refers to a node that is a parent node of both (or more) nodes. As noted above, the LCA refers to a common ancestor that is farthest from the root of the DOM.

As further described herein, to match test steps across test cases, at least one embodiment of the invention includes defining a canonical representation of a test step s as $\sigma(s)=[[\sigma(a), \sigma(e), \sigma(d)]]$. $\sigma(a)$ maps command a to the constant A if a is a generic action command; otherwise, $\sigma(a)=a$. $\sigma(e)$ maps element e to its XPath. $\sigma(d)$ maps d to the Boolean value for true if d is nonempty, and maps d to the value for false otherwise. The canonical representation abstracts out generic action commands and data values so that test steps in different contexts can be matched. Thus, the canonical representations of step 2 of $t_1$ and $t_2$ are the same.

Also, at least one embodiment of the invention includes defining path equivalence on the given DOM. A DOM node has a type (for example, table, button, image, etc.) and a set of HTML attributes (for example, identifier (ID), name, class, etc.) associated therewith. Node n is equivalent to node m if and only if the nodes have the same type, the same set of attributes, and the same value for each attribute. Let idx(n) denote the index of n, and let $p=(n_1, \ldots, n_k)$ and $q=(m_1, \ldots, m_k)$ be two paths in the DOM. Then, $p\equiv q$ if and only if, for all $1 \leq i \leq k$, $n_i$ is equivalent to $m_i$ and for all $1 \leq i \leq k-1$, $idx(n_i)=idx(m_i)$.

As described herein, at least one embodiment of the invention includes three phases. The first phase includes analyzing individual test cases to compute groupings of test steps into candidate sub-routines based on how UI elements are accessed in the noted steps. This phase can be performed dynamically by leveraging execution traces of test cases or statically by analyzing the test cases only. The second phase includes comparing candidate sub-routines across test cases, as well as merging and refining the sub-routines to compute a final set of sub-routines. The third phase includes creating callable sub-routines, with parameterized data and control flow, and replacing steps in the original test cases with calls to the sub-routines with context-specific data and control parameters.

Additionally, one or more embodiments of the invention are not dependent to web-application implementation technologies or the tools used to create the GUI tests, and are applicable to tests for not only conventional web applications, but also AJAX-style applications in which there may be no clear "page" and "form" boundaries.

Referring again to the at least one embodiment of the invention that includes three phases, the first phase, as noted, includes analyzing each test case independently to partition test steps into candidate sub-routines. This phase also includes analyzing the occurrences of the accessed UI elements in the given DOM. Additionally the first phase includes using one or more distance metrics on the DOM to detect the loading of a new page and, consequently, the beginning of a new module. For example, distance metrics that quantify the extent to which a test step accesses a different part of the DOM than its preceding test steps can be used to identify the beginning of a new module. An example distance metric is detailed further herein. As also noted above, this phase can be performed dynamically by leveraging execution traces that include the DOM snapshot after each test step, or this phase can be performed statically by analyzing the test cases only. If DOM snapshots are available, the candidate sub-routines can be computed more accurately (at the additional cost of trace collection). The output of this first phase is a set of candidate sub-routines, which feeds into the subsequent phases.

As such, the second phase, as noted above, includes comparing candidate sub-routines across test cases to compute the final set of sub-routines. This phase includes creating initial groups of candidate sub-routines and analyzing each such group to determine the element overlap among the sub-routines. At this step, a group can be split into smaller groups that have greater cohesion in terms of the accessed UI elements. Additionally, the second phase includes analyzing the sequence of steps in each sub-routine to detect conflicts, which can result in further refinement of a sub-routine group into smaller groups. The output of this second phase is a final set of sub-routines.

The third phase includes performing test refactoring to transform the original test suite into a suite that includes reusable sub-routines and modular test cases. Specifically, the third phase includes creating callable sub-routines, with parameterized data and control flow, and replacing steps in the original test cases with calls to the sub-routines along with context-specific data and control parameters.

FIG. 1A is a diagram illustrating an example registration page 102 for a bookstore web application. Multiple testing scenarios are possible for this example page 102. For instance, after providing the required data in the fields: (1) clicking the "Register" button results in successful registration, (2) clicking the "Cancel" button causes the registration process to terminate and the previous page to be displayed, and (3) clicking the "Clear" button erases all entered data and control remains on the Registration page. In addition to these (valid) scenarios, there can be error scenarios to be exercised as well—attempting to register with an already existing login ID or without providing all required information—in which case, registration fails with an appropriate error message.

FIG. 1B is a diagram illustrating two test cases that navigate the example registration page for the bookstore web application depicted in FIG. 1A. Test $t_1$ 103 exercises the valid scenario of successful registration, whereas test $t_2$ 105 covers the error scenario wherein registration is attempted without providing data for the required "Confirm Password" field. As detailed above, a test case is a sequence of steps wherein each step includes an action, a target UI element on which the action is performed, and an optional data value. By way of example, step 12 in $t_1$ 103 and step 7 in $t_2$ 105 contain assertions that verify successful and failed registration, respectively.

FIG. 2 is a diagram illustrating an extracted sub-routine 202, as well as refactored versions of the test cases (204 and 206) depicted in FIG. 1B, according to an example embodiment of the invention. As detailed herein, given a suite of GUI test cases, at least one embodiment of the invention includes refactoring the tests by extracting reusable sub-routines and replacing steps in the original tests with calls to the extracted sub-routines.

By way of example, FIG. 2 depicts the refactored bookstore test cases 204 and 206, as well as the extracted sub-routine for entering registration information 202. To simplify the presentation, pseudo-code notation is used in FIG. 2 to illustrate the sub-routine and the tests. In an example embodiment of the invention, the implemented tool creates the refactored test suite as Selenium test cases, written in Java, which can be executed using JUnit. The extracted sub-routine, EnterRegDetails 202, contains test steps that are executed on the registration page and takes two input parameters: an array data of context-specific data values for the test steps, and an array control of Boolean flags controlling the execution of the test steps. The values of data are used in those test steps that require data: steps 1, 2, 4, 5, and 6. The Boolean flags in control determine whether steps 4 and 9 are executed; the remaining steps execute unconditionally. Tests $t_1$ and $t_2$ are refactored (as depicted by elements 204 and 206, respectively, in FIG. 2) to call EnterRegDetails 202 (line 4 in both $t_1$ and $t_2$), and set-up the context-specific data and control parameters (lines 1 and 2 in both $t_1$ and $t_2$). The data setup in $t_1$ creates five data values, whereas the data setup in $t_2$ creates four values—the third parameter, which is used for the "Confirm Password" text box, is empty because the corresponding test step (that is, step 4 in EnterRegDetails 202) does not execute when EnterRegDetails 202 is called from $t_2$. The control setup (line 2) ensures that when EnterRegDetails is invoked from $t_1$, step 4 executes and step 9 does not execute; the converse is true when EnterRegDetails is called from $t_2$.

Figure 3:
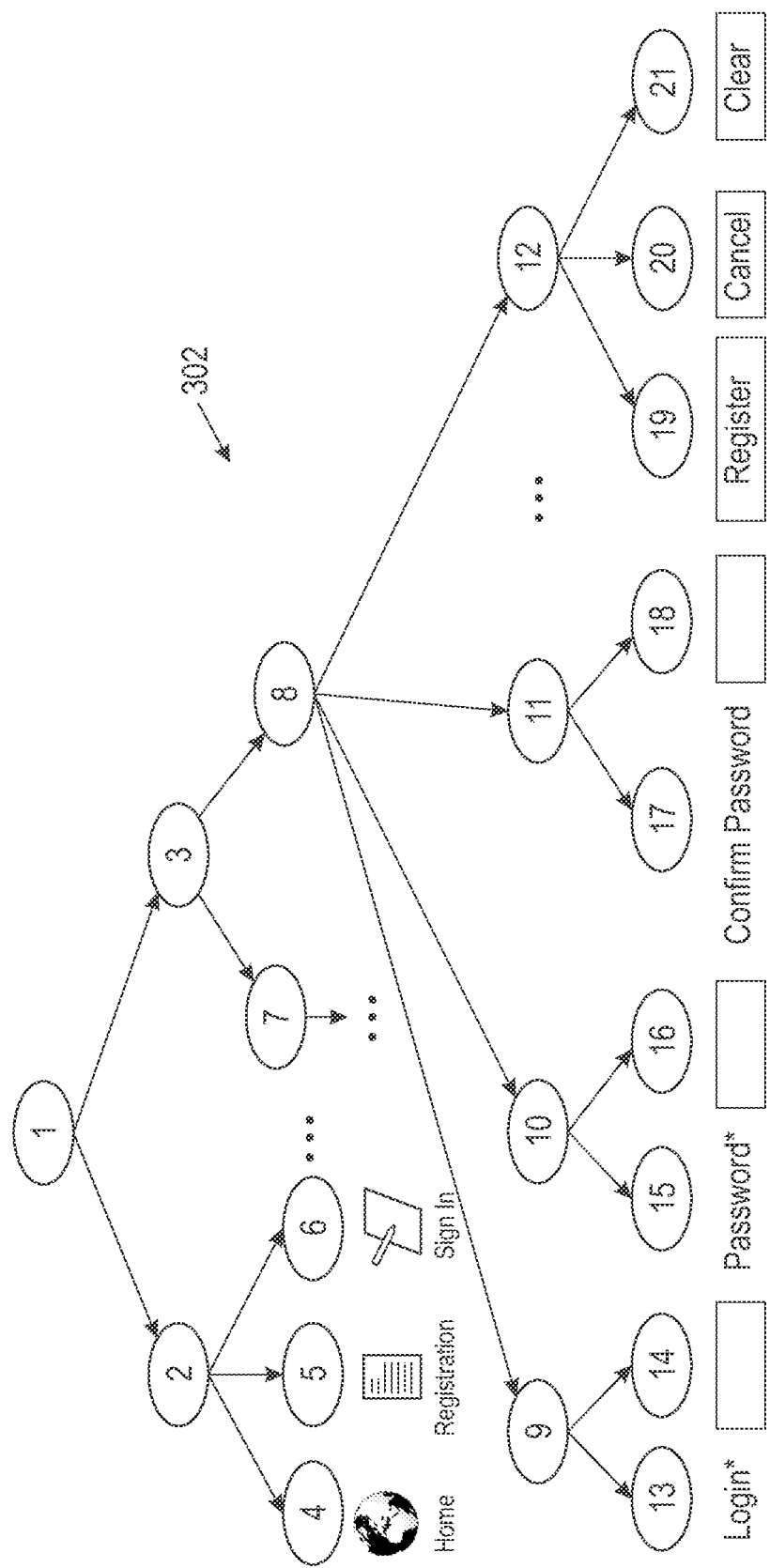
FIG. 3 is a diagram illustrating a partial Document Object Model (DOM) for the example bookstore registration page depicted in FIG. 1A, according to an example embodiment of the invention.

FIG. 3 is a diagram illustrating a partial DOM for the example bookstore registration page depicted in FIG. 1A, according to an example embodiment of the invention. As further detailed in connection with one or more examples described herein, the UI elements, labels, and other HTML elements are nodes in the DOM 302.

FIG. 4 is a diagram illustrating an example algorithm 402 for identifying candidate sub-routines, according to an example embodiment of the invention. As detailed herein, at least one embodiment of the invention includes computing candidate sub-routines. Accordingly, FIG. 4 depicts the analysis performed in the first phase (as detailed herein), which takes as input a test suite T and produces as output the set of candidate sub-routines for the tests in T. The algorithm 402 partitions the steps of each test case based on the locations of the referenced UI elements in the DOM. Intuition utilized herein includes that the proximity of the referenced UI elements indicates logical groupings of steps: test steps that access closely-located elements in the DOM pertain to actions performed on a "page" or "form," whereas a step that accesses a significantly different part of the DOM than its preceding step potentially begins a new sub-routine. More concretely, the analysis performed via algorithm 402 determines such information by computing the LCA of a set E of UI element nodes. The farther away that the LCA of E is from the DOM root node, the more likely that the UI elements in E are related. Conversely, if the LCA is close to the root, E contains widely dispersed and potentially unrelated UI elements.

A candidate sub-routine $S_c=(D, \psi, E, p)$, wherein D is a DOM, $\psi$ is a sequence of test steps, E is the set of UI elements referenced in the steps in $\psi$, and p, referred to as path prefix, is the path in D from the root node to the LCA of all nodes in E.

As detailed herein, the first phase of one or more embodiments of the invention can be performed statically or dynamically. Algorithm 402 in FIG. 4 depicts the dynamic variant of the first phase, which assumes that an execution trace containing the DOM snapshot before each test step is available.

Algorithm 402 of FIG. 4 iterates over each test case t (line 1) and each step in t (line 3). Line 4 reads the DOM snapshot before step s from the execution trace, and line 5 computes the LCA of e (the UI element referenced at s) and $l_{prev}$ (the LCA from the previous iteration, which is undefined for the first test step). The LCA computation locates the nodes for e and $l_{prev}$ in $D_{curr}$. Both e and $l_{prev}$ have XPaths associated therewith, so algorithm 402 uses path equivalence to locate e and $l_{prev}$ in $D_{curr}$. If step s results in the loading of a new page, $l_{prev}$ would not appear in $D_{curr}$; in this case, the algorithm returns e.

Next, the algorithm 402 calls the startNewSubroutine( ) function (line 6), which uses two metrics to determine whether a new sub-routine should be started at s. First, startNewSubroutine( ) checks and/or determines whether all elements in E (that is, the elements referenced by steps in the candidate sub-routine under consideration) appear in $D_{curr}$. If all elements in E do appear in $D_{curr}$, the function proceeds with the second check; otherwise, it returns true, indicating that a new sub-routine should be started. Typically, the latter condition would indicate a server-side communication that re-renders the DOM, causing previously referenced elements to no longer be available. Also, this check is performed only in the dynamic variant of the first phase.

Second, startNewSubroutine( ) checks and/or determines whether the normalized difference between the distances of $l_{prev}$ and $l_{curr}$ from the root node of $D_{curr}$ exceeds a threshold value:

$$\frac{\delta(l_{prev}, D_{curr}) - \delta(l_{curr}, D_{curr})}{\delta(l_{prev}, D_{curr})} > \lambda_d$$

wherein $\delta(n, D)$ returns the distance of n from the root node of D. Intuitively, this formula captures whether s accesses a UI element in a substantially different part of the DOM than the part accessed in the preceding steps, thus causing a shift in the LCA node toward the DOM root. To accommodate cases wherein $l_{prev}$ itself is close to the DOM root, before applying the distance metric, startNewSubroutine( ) checks and/or determines whether $l_{curr}$ is the HTML body element and, if it is, returns true.

If a new sub-routine is to be started, algorithm 402 updates the information for the current sub-routine $S_c$ (lines 7-9), adds $S_c$ to the set of candidate sub-routines (line 10), and re-initializes $S_c$ and $l_{prev}$ (line 11). However, if start- NewSubroutine( ) returns false, algorithm 402 updates $l_{prev}$ for the next iteration. In either case, algorithm 402 also adds e and s to $S_c$.

Additionally, consider the partitioning of the steps of $t_1$ (as depicted in element 103 in FIG. 1B) using DOM 302 depicted in FIG. 3. The first test step accesses the Registration image. Line 5 of algorithm 402 sets $l_{curr}$ to a given node (node 5, for example) ($l_{prev}$ is undefined). In the next iteration, test step 2, which accesses the log-in text box (node 14, for example), is processed. In this example, the LCA of nodes 5 and 14 is the root node. The distance metric on the old LCA (that is, node 5) and the new LCA (node 1, for example) evaluates to 1 ($\delta(l_{curr}, D_{urr})=0$), which exceeds the threshold $\lambda_d$ (setting $\lambda_d=0.75$, as used in this example embodiment). Thus, the current candidate sub-routine is completed—it contains step 1 only—and step 2 and node 14 are added to a new candidate sub-routine. Next, test step 3 is processed. The new LCA can be identified, for example, as node 8, and the distance metric is calculated as 0.5, which is within the threshold. Therefore, step 3 and, for example, node 16, are added to the current sub-routine. The algorithm 402 proceeds in this manner, adding steps 4-7, for which the referenced UI elements occur in the sub-tree rooted at node 8, to the current sub-routine. After step 7, a new page is loaded on which step 8 is performed. Accordingly, the current sub-routine is completed and a new sub-routine is initialized.

As such, in the noted example embodiment described above, algorithm 402 computes four candidate sub-routines for $t_1$, shown in rows 1-4 of Table I (as illustrated below). Two of the sub-routines, $S_{c_1}^1$ and $S_{c_3}^1$, have only one test step each, whereas the remaining two, $S_{c_2}^1$ and $S_{c_4}^1$, have six and four steps, respectively. Similarly, two candidate sub-routines are computed for $t_2$, shown in the last two rows of Table I, illustrated below.

TABLE I

CANDIDATE SUBROUTINES COMPUTED FOR $t_1$ AND $t_2$ IN PHASE 1.

| Subroutine | D | $\psi$ | E | p |
|---|---|---|---|---|
| $S_{c_1}^1$ | DOM rooted at node 5 | <1> | {5} | (1, 2, 5) |
| $S_{c_2}^1$ | DOM rooted at node 8 | <2, 3, 4, 5, 6, 7> | {14, 16, 18, 19, ...} | (1, 3, 8) |
| $S_{c_3}^1$ | DOM rooted at node 6 | <8> | {6} | (1, 2, 6) |
| $S_{c_4}^1$ | ... | <9, 10, 11, 12> | {...} | (...) |
| $S_{c_1}^2$ | DOM rooted at node 5 | <1> | {5} | (1, 2, 5) |
| $S_{c_2}^2$ | DOM rooted at node 8 | <2, 3, 4, 5, 6, 7> | {14, 16, 19, ...} | (1, 3, 8) |

The static variant of the first phase algorithm 402 differs from the dynamic variant in at least two ways. First, for example, at line 4, $D_{curr}$ is not set to the DOM snapshot; instead, $D_{curr}$ is built incrementally by adding XPaths thereto for the referenced UI elements, one at a time. Thus, at any point in the algorithm, $D_{curr}$ corresponds to the DOM observed by the test steps in the current candidate sub-routine. Also, in the static variant, startNewSubroutine( ) does not perform the first check—the first check is redundant because all elements in E would always occur in the observed DOM.

As also detailed herein, at least one embodiment of the invention includes computing final sub-routines. Accordingly, in at least one embodiment of the invention, the second phase (as noted above and herein) commences by grouping the candidate sub-routines into one or more sub-routine groups. The second phase additionally includes refining each sub-group, which can require splitting a sub-group into smaller sub-groups of more cohesive sub-routines, to compute the final set of sub-routines. As used here, refining includes splitting a sub-group into smaller sub-groups.

A sub-routine group, $S_G=\{S_{c1}, \ldots, S_{ck}\}$, $k \geq 1$, is a set of candidate sub-routines such that for each pair $S_{ci}, S_{cj} \in S_G$, $i \neq j$, $p_i = p_j$. In other words, $S_G$ is the set of candidate sub-routines that have equivalent path prefixes. For the candidate sub-groups encompassed by the example depicted in Table I, an example embodiment of the invention includes computing four sub-routine groups: $S_{G1}=\{S_{c_1}^1, S_{c_1}^2\}$ groups two of the sub-routines based on the equivalent path prefix (1, 2, 5); $S_{G2}=\{S_{c_2}^1, S_{c_2}^2\}$ groups two sub-routines based on the equivalent path prefix (1, 3, 8); and the remaining two groups contain one candidate sub-routine each.

The sub-routine groups thus created can include a conservative initial grouping. As noted, the second phase can include refining the initial groupings. For example, the second phase can include analyzing the overlap of UI elements among the sub-routines in a group to refine the group into smaller groups. Additionally, for instance, the second phase can include computing a total order of the test steps for a group, and splitting a group when necessary to resolve sequencing conflicts.

FIG. 5 is a diagram illustrating an example algorithm 502 for computing final sub-routines, according to an example embodiment of the invention. Algorithm 502 presents the analysis performed to compute the final set of sub-routines. Algorithm 502 takes as input a set $S_g$ of sub-routine groups and returns the set $S_f$ of final sub-routines. Lines 1-11 refine the sub-groups based on element overlap. Intuitively, the analysis determines the "cohesion" of candidate sub-routines in a group based on the referenced UI elements. The cohesion of two sub-routines in terms of UI elements can be computed by calculating the intersection of the UI elements accessed in those sub-routines. Such a determination serves to separate out potentially incorrect groupings; for example, two sub-routines that perform actions on different pages but coincidentally have the same path prefix (for which they were put in the same initial group) can be separated based on low element overlap.

Algorithm 502 iterates over each $S_{Gi}$ in the input set of sub-routine groups (line 2), and removes sub-routines from $S_{Gi}$ until $S_{Gi}$ becomes empty (lines 3-10), creating one or more refined groups $S_{Go}$ in the process. First, algorithm 502 sorts the sub-routines in $S_{Gi}$ based on the sizes of their element sets and initializes the output group $S_{Go}$ with the first sub-routine (lines 4-5). Then, algorithm 502 incrementally builds $S_{Go}$ by moving those elements that have a high overlap with the set of DOMs in $S_{Go}$. The parameter $\lambda_e$ determines whether a candidate sub-routine is moved to $S_{Go}$. When the loop in line 6 terminates, some or all of the sub-routines in $S_{Gi}$ will have been moved to $S_{Go}$. If there are remaining sub-routines in $S_{Gi}$, this process is repeated.

Note that the element intersection in line 8 is computed with respect to the DOM objects in the candidate sub-routines. In the dynamic variant of the first phase, even elements that are not referenced in a test case, but that occur in the DOM rooted at the LCA, appear in the sub-routine DOM object. This can result in accommodating the scenario wherein two tests navigate to the same form but access different sets of UI elements in the form, with little or no overlap. The element intersection of these tests, as computed in line 8, would still be high because the respective DOMs contain the non-referenced elements as well. Thus, the initial grouping of these tests is maintained. However, for the static variant of the first phase—in which case the sub-routine DOM is the observed DOM—algorithm 502 would separate these tests into different sub-routine groups because of low element overlap.

After refining $S_g$ into $S_{g1}$, algorithm 502 computes the final sub-routines (lines 12-25), which involves creating, for each sub-routine group $S_G$ in $S_{g1}$, a total order of step sequences.

Let $S_G = \{S_{c1}, \ldots, S_{ck}\}$ be a sub-routine group. Also, let $\psi_1, \ldots, \psi_k$ be the step sequences in the sub-routines in $S_G$, with each test step in its canonical representation. A final sub-routine $S_f = (\Psi, \gamma)$ is constructed from $S_G$, wherein $\Psi$ is an interleaving of $\psi_1, \ldots, \psi_k$ such that, for any $\psi_i$, the order of steps in $\psi_i$ is preserved in $\Psi$; $\gamma$ is a function that maps a step to the test cases in which the step occurs.

In one or more embodiments of the invention, the total order in a final sub-routine must ensure that the order of execution of steps in the original tests is preserved when the sub-routine is called from those tests. This is necessary to guarantee behavior-preserving sub-routine extraction. Consider, for example, the sub-routine group $S_{G2}$ for the bookstore example (as illustrated in FIG. 1A, FIG. 1B and FIG. 2), which includes two candidate sub-routines (as detailed in rows 2 and 6 of Table I) with six steps each, five of which are common. The total ordering shown at the top of FIG. 2 preserves the execution order of the steps from $t_1$ and $t_2$.

In one or more embodiments of the invention, some preceding relations between test steps must be preserved (for example, steps 2-5 must execute before step 6 in $t_2$), whereas other relations can be relaxed (for example, the order of execution of steps 4 and 5 does not matter). Additionally, one or more embodiments of the invention, although steps can be reordered in a semantics-preserving manner, include ensuring that all preceding relations are preserved in the final sub-routine; if conflicts occur, the sub-routine group is refined via splitting.

Computing a precedence-preserving total order and detecting conflicts can be carried out by constructing a directed graph in which a cycle indicates conflicts, and a topological sort on the final (acyclic) graph gives a precedence-preserving total order. At a high level, this is analogous to the actions performed by algorithm 502 in lines 13-25. Algorithm 502 iterates over each sub-routine group (line 13), and processes each candidate sub-routine, starting with the sub-routine with the longest step sequence (lines 14-15). Line 18 initializes a graph G in which nodes represent canonical representations of test steps and edges represent the order of execution among steps. (Initially, this graph does not have a branching structure.) Then, for each sub-routine $S_c$ in the group, algorithm 502 attempts to add the steps of $S_c$, in order, to G. If the addition of a step and its out-edge results in a cycle in G, algorithm 502 has detected a conflicting sequence. In that case, algorithm 502 omits $S_c$ and proceeds to the next sub-routine. If the addition of the steps of $S_c$ to G causes no cycles in G, $S_c$ is removed from $S_G$ and the step-to-tests map $\gamma$ is updated for the newly-added steps (lines 22-23).

After each sub-routine has been processed, a topological sort of G provides the total step sequence $\Psi$, which along with the map $\gamma$, is added to the set of final sub-routines (lines 24-25).

As noted above and further described herein, the third phase of at least one embodiment of the invention includes using the set of final sub-routines to create a transformed test suite. The third phase includes creating a callable sub-routine for each final sub-routine $S_f = (\Psi, \gamma)$ in $S_f$. To do this, the third phase includes determining which statements in $\Psi$ execute conditionally and which statements execute unconditionally (in other words, in all calling contexts). The mapping information $\gamma$ maps each test step in $\Psi$ to the set of tests containing that step. Thus, the union of the tests in the range of $\gamma$ provides the set of tests $T_c$ that forms all calling contexts for $S_f$. Additionally, for any step $s \in \Psi$, if $\gamma(s) = Y_c$, s executes unconditionally; otherwise, s executes conditionally. The third phase also includes creating a formal control parameter and enclosing the conditionally-executing test steps of the sub-routine in if statements, as illustrated for EnterRegDetails in FIG. 2. Also, for each test step that takes a data value, code generation parameterizes the data references in the test steps.

After creating the sub-routines, the third phase includes refactoring each test case by replacing tests steps with calls to the sub-routines, and adding statements that set-up the actual parameters for the calls with context-specific data and control values. To accomplish this, the third phase includes leveraging a mapping function that maps a step in a given test case to an element of $S_f$ or to $\epsilon$ if that step does not involve a sub-routine call.

Figure 6:
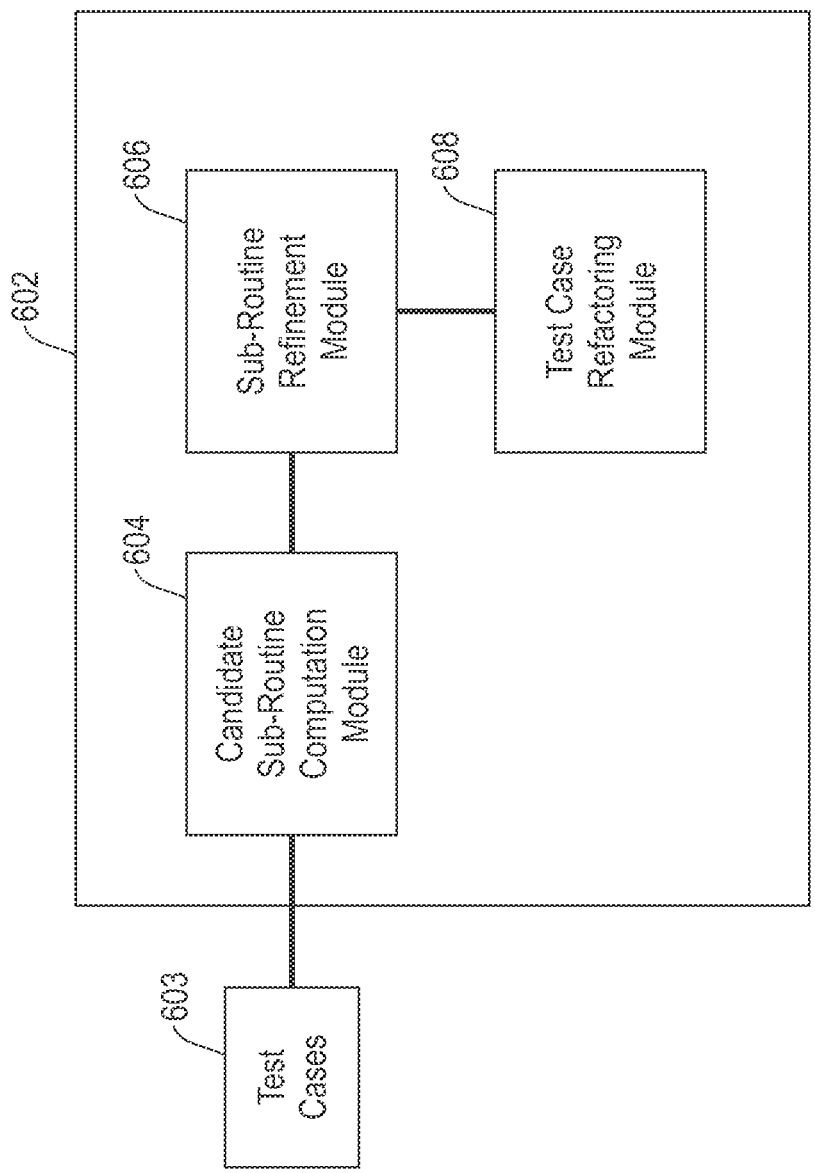
FIG. 6 is a diagram illustrating system architecture, according to an example embodiment of the invention.

FIG. 6 is a diagram illustrating system architecture, according to an example embodiment of the invention. By way of illustration, FIG. 6 depicts a test case modularization system 602, which includes a candidate sub-routine computation module 604, a sub-routine refinement module 606, and a test case refactoring module 608. The candidate sub-routine computation module 604 receives and analyzes individual test cases 603 to compute groupings of test steps into candidate sub-routines based on how UI elements are accessed in the test steps. Additionally, sub-routine refinement module 606 compares candidate sub-routines, generated from the candidate sub-routine computation module 604, across test cases, and refines one or more of the candidate sub-routines to compute a final set of sub-routines. Further, the test case refactoring module 608 creates, based on the final set of sub-routines generated by the sub-routine refinement module 606, callable sub-routines with parameterized data and control flow, and replaces steps in the original test cases (such as test cases 603) with calls to the sub-routines (such as those generated by module 606) with context-specific data and control parameters.

Figure 7:
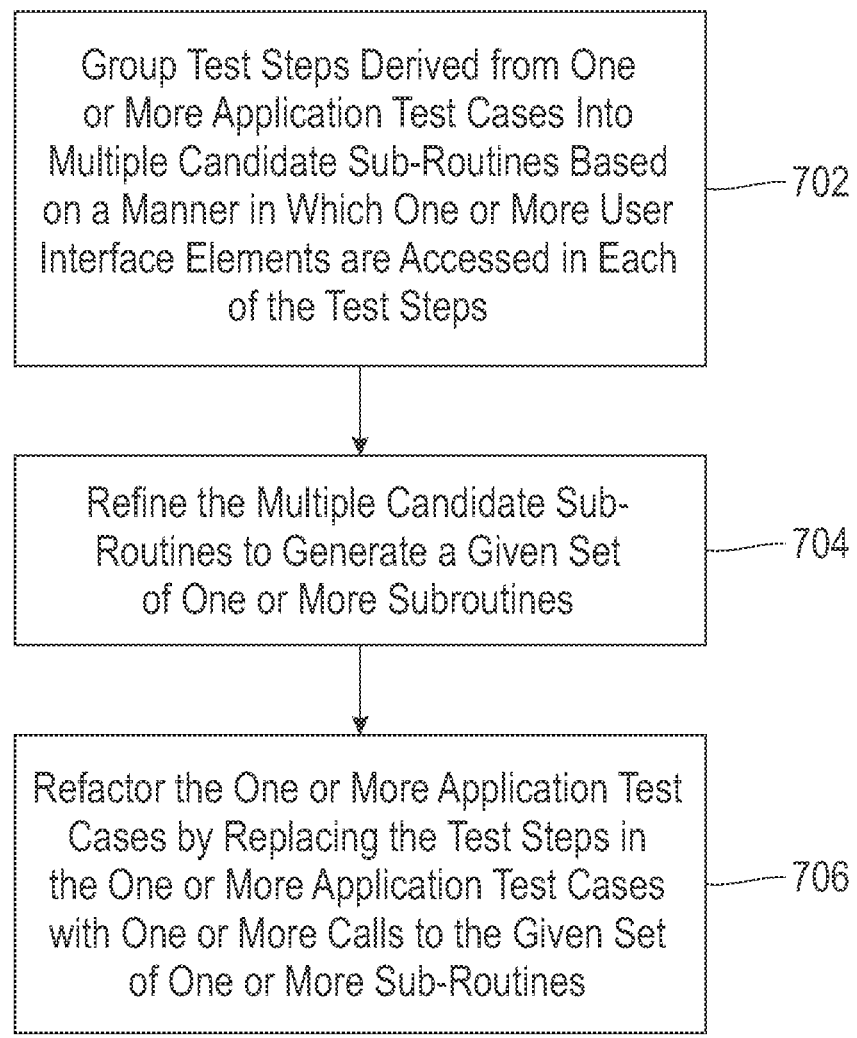
FIG. 7 is a flow diagram illustrating techniques according to an embodiment of the invention.

FIG. 7 is a flow diagram illustrating techniques according to an embodiment of the present invention. Step 702 includes grouping test steps derived from one or more application test cases into multiple candidate sub-routines based on a manner in which one or more user interface elements are accessed in each of the test steps, wherein said grouping is executed by a candidate sub-routine computation module of a computing device. Grouping can include analyzing (i) each user interface element and (ii) a structure of each web page accessed in each of the one or more application test cases. Grouping can also include analyzing multiple sequences of one or more DOM snapshots for each of the one or more application test cases.

Further, grouping can include grouping the test steps derived from the one or more application test cases into multiple candidate sub-routines dynamically by leveraging one or more execution traces of the one or more application test cases. Grouping can also include grouping the test steps derived from the one or more application test cases into multiple candidate sub-routines statically by analyzing only graphical user interface test cases from the one or more application test cases.

Step 704 includes refining the multiple candidate sub-routines to generate a given set of one or more sub-routines, wherein said refining is executed by a sub-routine refinement module of the computing device. Refining can include comparing the multiple candidate sub-routines across the one or more application test cases, merging two or more of the multiple candidate sub-routines, and/or grouping the multiple candidate sub-routines based on common prefix. Additionally, refining can include determining user interface element overlap among the multiple candidate sub-routines as well as detecting one or more conflicts in step sequences among the multiple candidate sub-routines.

Step 706 includes refactoring the one or more application test cases by replacing the test steps in the one or more application test cases with one or more calls to the given set of one or more sub-routines, wherein said refactoring is executed by a test case refactoring module of the computing device.

The techniques depicted in FIG. 7 can also include parameterizing each sub-routine in the given set of one or more sub-routines with (i) one or more items of context-specific data and (ii) one or more items of control information. Additionally, at least one embodiment of the invention can include generating, based on the given set of one or more sub-routines, one or more callable sub-routines that include a total ordering of test steps.

At least one embodiment of the invention also includes comparing the multiple sequences across the one or more application test cases to generate a context in which one or more of the test steps are performed.

Also, an additional aspect of the invention includes a modularization device that includes a candidate sub-routine computation module, executing on the modularization device, to cluster test steps derived from multiple application test cases into multiple candidate sub-routines based on information pertaining to user interface element access associated with each of the test steps. The device also includes a sub-routine refinement module, executing on the modularization device, to refine the multiple candidate sub-routines to generate a final set of one or more sub-routines. Further, the device includes a test case refactoring module, executing on the modularization device, to refactor each of the multiple application test cases by replacing each of the test steps in each of the multiple application test cases with a call to a sub-routine in the final set of one or more sub-routines. Also, in at least one embodiment of the invention, the candidate sub-routine computation module, the sub-routine refinement module, and the test case refactoring module are coupled to a display for presentation to a user.

The techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 8:
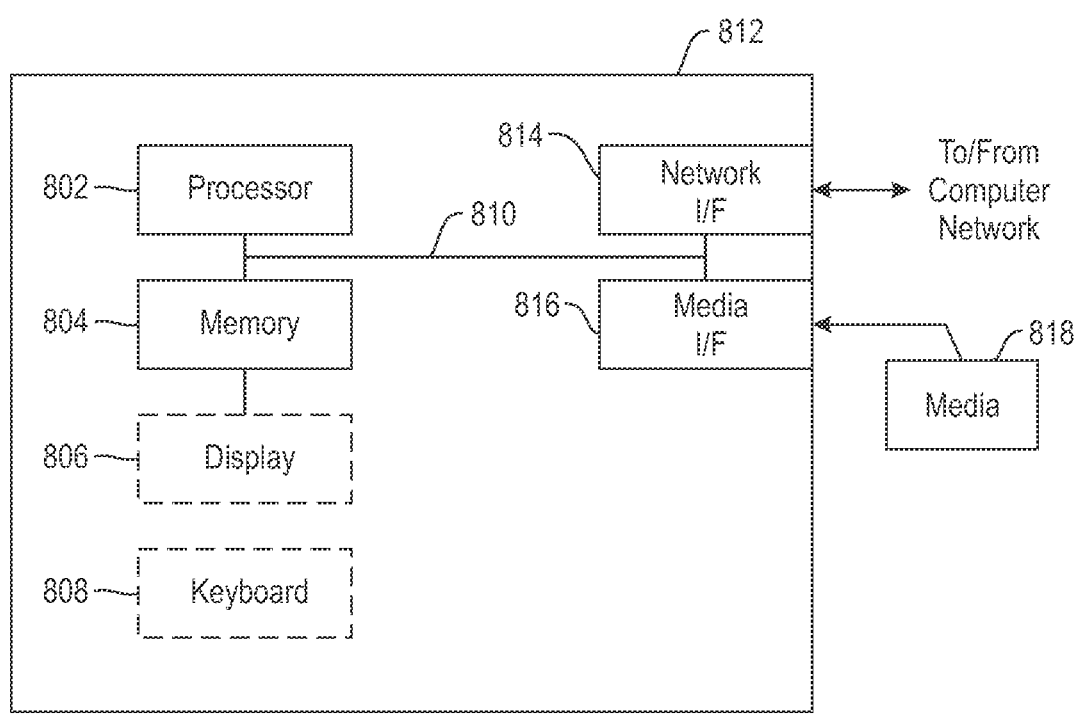
FIG. 8 is a system diagram of an exemplary computer system on which at least one embodiment of the invention can be implemented.

Additionally, an aspect of the present invention can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like)

can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, automatically modularizing GUIs without requiring a training sample of sub-routines, as well as parameterizing sub-routines with context-specific data and control information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The teiininology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
grouping test steps derived from one or more application test cases into multiple candidate sub-routines based on a manner in which one or more user interface elements are accessed in each of the test steps, wherein said grouping is executed by a candidate sub-routine computation module of a computing device;
refining the multiple candidate sub-routines to generate a given set of one or more sub-routines, wherein said refining is executed by a sub-routine refinement module of the computing device; and
refactoring the one or more application test cases by replacing the test steps in the one or more application test cases with one or more calls to the given set of one or more sub-routines, wherein said refactoring is executed by a test case refactoring module of the computing device.

2. The method of claim 1, wherein said grouping comprises analyzing (i) each user interface element and (ii) a structure of each web page accessed in each of the one or more application test cases.

3. The method of claim 1, wherein said grouping comprises analyzing multiple sequences of one or more Document Object Model snapshots for each of the one or more application test cases.

4. The method of claim 1, wherein said grouping comprises grouping the test steps derived from the one or more application test cases into multiple candidate sub-routines dynamically by leveraging one or more execution traces of the one or more application test cases.

5. The method of claim 1, wherein said grouping comprises grouping the test steps derived from the one or more application test cases into multiple candidate sub-routines statically by analyzing only graphical user interface test cases from the one or more application test cases.

6. The method of claim 1, wherein said refining comprises comparing the multiple candidate sub-routines across the one or more application test cases.

7. The method of claim 1, wherein said refining comprises grouping the multiple candidate sub-routines based on common prefix.

8. The method of claim 1, wherein said refining comprises determining user interface element overlap among the multiple candidate sub-routines.

9. The method of claim 1, wherein said refining comprises detecting one or more conflicts in step sequences among the multiple candidate sub-routines.

10. The method of claim 1, comprising:
parameterizing each sub-routine in the given set of one or more sub-routines with (i) one or more items of context-specific data and (ii) one or more items of control information.

11. The method of claim 1, comprising:
generating, based on the given set of one or more sub-routines, one or more callable sub-routines that include a total ordering of test steps.

12. An article of manufacture comprising a non-transitory computer readable storage medium having program instructions embodied therewith, the program instructions executable by a computing device to cause the computing device to:

group test steps derived from one or more application test cases into multiple candidate sub-routines based on a manner in which one or more user interface elements are accessed in each of the test steps;

refine the multiple candidate sub-routines to generate a given set of one or more sub-routines; and refactor the one or more application test cases by replacing the test steps in the one or more application test cases with one or more calls to the given set of one or more sub-routines.

13. The article of manufacture of claim 12, wherein said grouping comprises analyzing (i) each user interface element and (ii) a structure of each web page accessed in each of the one or more application test cases.

14. The article of manufacture of claim 12, wherein said grouping comprises grouping the test steps derived from the one or more application test cases into multiple candidate sub-routines dynamically by leveraging one or more execution traces of the one or more application test cases.

15. The article of manufacture of claim 12, wherein said grouping comprises grouping the test steps derived from the one or more application test cases into multiple candidate sub-routines statically by analyzing only graphical user interface test cases from the one or more application test cases.

16. The article of manufacture of claim 12, wherein the program instructions executable by a computing device further cause the computing device to:

parameterize each sub-routine in the given set of one or more sub-routines with (i) one or more items of context-specific data and (ii) one or more items of control information.

17. The article of manufacture of claim 12, wherein said refining comprises grouping the multiple candidate sub-routines based on common prefix.

18. The article of manufacture of claim 12, wherein said refining comprises determining user interface element overlap among the multiple candidate sub-routines.

19. A system comprising:
a memory; and
at least one processor coupled to the memory and configured for:
grouping test steps derived from one or more application test cases into multiple candidate sub-routines based on a manner in which one or more user interface elements are accessed in each of the test steps;
refining the multiple candidate sub-routines to generate a given set of one or more sub-routines; and
refactoring the one or more application test cases by replacing the test steps in the one or more application test cases with one or more calls to the given set of one or more sub-routines.

20. A modularization device comprising:
a candidate sub-routine computation module, executing on the modularization device, to cluster test steps derived from multiple application test cases into multiple candidate sub-routines based on information pertaining to user interface element access associated with each of the test steps;
a sub-routine refinement module, executing on the modularization device, to refine the multiple candidate sub-routines to generate a final set of one or more sub-routines; and
a test case refactoring module, executing on the modularization device, to refactor each of the multiple application test cases by replacing each of the test steps in each of the multiple application test cases with a call to a sub-routine in the final set of one or more sub-routines;
wherein the candidate sub-routine computation module, the sub-routine refinement module, and the test case refactoring module are coupled to a display for presentation to a user.

* * * * *